US009527485B2

United States Patent
Nakamura et al.

(10) Patent No.: US 9,527,485 B2
(45) Date of Patent: Dec. 27, 2016

(54) BRAKE SYSTEM INPUT APPARATUS AND VEHICLE BRAKE SYSTEM

(71) Applicant: NISSIN KOGYO CO., LTD., Ueda, Nagano (JP)

(72) Inventors: Motoyasu Nakamura, Nagano (JP); Toshiya Shimozaki, Nagano (JP); Nobuyuki Kobayashi, Nagano (JP); Kouji Sakai, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/560,276

(22) Filed: Dec. 4, 2014

(65) Prior Publication Data

US 2015/0158466 A1 Jun. 11, 2015

(30) Foreign Application Priority Data

Dec. 5, 2013 (JP) .................................. 2013-251854

(51) Int. Cl.
*B60T 7/04* (2006.01)
*B60T 8/36* (2006.01)
(Continued)

(52) U.S. Cl.
CPC ................ *B60T 7/042* (2013.01); *B60T 8/368* (2013.01); *B60T 11/16* (2013.01); *B60T 11/18* (2013.01);
(Continued)

(58) Field of Classification Search
CPC ........... B60T 7/042; B60T 11/16; B60T 11/18; B60T 13/142; B60T 13/143; B60T 2220/04
(Continued)

(56) References Cited

U.S. PATENT DOCUMENTS 7,032,982 B2 * 4/2006 Ogiwara ............... B60T 8/4081
    303/114.1
2003/0048182 A1 * 3/2003 Fulks et al. ................... 340/479
(Continued)

FOREIGN PATENT DOCUMENTS

DE  19632035   2/1998
DE  19855358   6/2000
(Continued)

OTHER PUBLICATIONS

European Search Report for related EP application No. 14196275.3-1756 dated Apr. 9, 2015, 6 pages.
(Continued)

*Primary Examiner* — Thomas J Williams
(74) *Attorney, Agent, or Firm* — Andrew M. Calderon; Roberts Mlotkowski Safran Cole & Calderon, P.C.

(57) ABSTRACT

One embodiment provides a brake system input apparatus into which a brake operation performed by an operating person is inputted, including: a base body; a master cylinder that is provided in the base body and that generates a brake hydraulic pressure by a piston, the piston being connected to a brake operator; a stroke sensor unit that is attached to the base body on a side of the master cylinder and that has a detection element, the detection element being configured to detect a sliding stroke of the piston; and a control circuit board that is provided on a side of the base body, wherein the stroke sensor unit has a connection terminal portion that is connected to a connection terminal of the control circuit board, and wherein the connection terminal portion is disposed so as to face the control circuit board.

21 Claims, 4 Drawing Sheets

(51) Int. Cl.
 *B60T 11/16* (2006.01)
 *B60T 11/18* (2006.01)
 *B60T 8/38* (2006.01)
 *B60T 8/40* (2006.01)

(52) U.S. Cl.
 CPC ............. *B60T 8/38* (2013.01); *B60T 8/4081* (2013.01); *B60T 2220/04* (2013.01)

(58) Field of Classification Search
 USPC .... 303/114.1, 114.3, 20; 188/355, 356, 357, 188/358, 359, 360
 See application file for complete search history.

(56) References Cited

U.S. PATENT DOCUMENTS

| | | | |
|---|---|---|---|
| 2003/0075975 A1* | 4/2003 | Fulks et al. | 303/113.4 |
| 2005/0057092 A1* | 3/2005 | Segawa | B60T 8/368 303/116.4 |
| 2009/0114865 A1 | 5/2009 | Homann et al. | |
| 2012/0167560 A1* | 7/2012 | Richard et al. | 60/446 |
| 2012/0298897 A1 | 11/2012 | Nakamura et al. | |
| 2013/0205881 A1* | 8/2013 | Naether et al. | 73/121 |
| 2013/0218407 A1 | 8/2013 | Jungbecker et al. | |
| 2013/0298550 A1* | 11/2013 | Leiber et al. | 60/545 |
| 2014/0216866 A1 | 8/2014 | Feigel et al. | |
| 2014/0298785 A1* | 10/2014 | Muller et al. | 60/327 |
| 2015/0061361 A1* | 3/2015 | Maruo | B60T 11/224 303/10 |
| 2015/0166030 A1* | 6/2015 | Kobayashi | B60T 13/58 303/14 |

FOREIGN PATENT DOCUMENTS

| | | | |
|---|---|---|---|
| DE | 102013202350 A1 * | 8/2014 | ............. B60T 7/042 |
| JP | H03148364 | 6/1991 | |
| JP | 2005104334 | 4/2005 | |
| JP | 2005329894 | 12/2005 | |
| JP | 2012210879 A | 11/2012 | |
| WO | WO-2012049050 | 4/2012 | |
| WO | WO-2013023953 | 2/2013 | |

OTHER PUBLICATIONS

Japanese Office Action for related JP application No. 2013-251854 dated Sep. 29, 2015, 8 pages.

* cited by examiner

BRAKE SYSTEM INPUT APPARATUS AND VEHICLE BRAKE SYSTEM

CROSS-REFERENCE TO RELATED APPLICATION(S)

This application claims priority from Japanese Patent Application No. 2013-251854 filed on Dec. 5, 2013, the entire contents of which are incorporated herein by reference.

FIELD

An embodiment described herein generally relates to a brake system input apparatus and a vehicle brake system.

BACKGROUND

Vehicle brake systems may include an input apparatus having a master cylinder that generates a brake hydraulic pressure according to an operation amount of a brake operator (for example, refer to JP-2012-210879-A).

In an input apparatus of JP-2012-210879-A, a stroke sensor is connected to a brake operator. The stroke sensor detects an actual stroke amount (a depression amount from an original position) that is an operation amount of the brake operator. The detected operation amount is converted into an electric signal to be outputted to a motor cylinder unit or the like that generates a brake hydraulic pressure by using a piston that is driven by a motor that functions as a drive source.

In such input apparatus, since the stroke sensor is connected to the brake operator, it may be necessary to ensure the space for installing the stroke sensor, and to spend the number of assembling man-hours for installing the input apparatus in the vehicle.

One object of the invention is to provide a brake system input apparatus that can easily ensure space in a vehicle where the brake system input apparatus is installed and can reduce the number of assembling man-hours in installing the same input apparatus in the vehicle and a vehicle brake system installing the brake system input apparatus.

SUMMARY

A first aspect of the invention provides a brake system input apparatus into which a brake operation performed by an operating person, is inputted, including: a base body; a master cylinder that is provided in the base body and that generates a brake hydraulic pressure by a piston, the piston being connected to a brake operator; a stroke sensor unit that is attached to the base body on a side of the master cylinder and that has a detection element, the detection element being configured to detect a sliding stoke of the piston; and a control circuit board that is provided on a side of the base body, wherein the stroke sensor unit has a connection terminal portion that is connected to a connection terminal of the control circuit board, and wherein the connection terminal portion is disposed so as to face the control circuit board.

"On a side of the master cylinder" includes every direction at right angles to an axis of the master cylinder therearound.

According to the first aspect, the input based on the brake operation performed by the operating person can be detected by the stroke sensor unit that is attached to the base body on the side of the master cylinder. Additionally, the detection signal that signals the operation amount detected by the stroke sensor unit is outputted from the connection terminal portion to the control circuit hoard via the connection terminal. Thus, the stroke sensor unit can be electrically connected to the control circuit board while the stroke sensor unit is configured as the integral part of the base body, and therefore, although the stroke sensor unit is integrated with the base body, the brake system input apparatus can be made small in size, thereby making it possible to obtain an advantage that the space for installing the brake system input apparatus in the vehicle can easily be ensured.

Due to the brake system input apparatus including the stroke sensor unit, compared with a case where the stroke sensor unit is configured as a separate body from the base body, the placement of the stroke sensor unit and the laying out of a signal wire are not needed. Thus, the number of assembling man-hours in installing the brake system input apparatus in the vehicle can be reduced, and the number of parts involved can also be reduced, thereby making it possible to realize a reduction in production costs.

A second aspect of the invention provides, based on the above-described configuration, the brake system input apparatus, wherein a mounting hole is formed in the base body along an axial direction of the master cylinder, and the stroke sensor unit is mounted in the mounting hole.

According to the second aspect, the stroke sensor unit can be installed in the mounting hole from the outside of the base body, and this facilitates the assemblage of the stroke sensor unit to the base body. Since the mounting hole is formed along the axial direction of the master cylinder, a relative positional relationship between a detected member provided on the piston and the stroke sensor unit can easily be adjusted by moving the stroke sensor unit along the axial direction of the master cylinder. This contributes to improvement in detection accuracy.

A third aspect of the invention provides, based on the above-described configuration, the brake system input apparatus, wherein the mounting hole is a stepped circular cylinder, and a gap between the stroke sensor unit and the base body is sealed up by a seal member that is disposed at a bottom of a large-diameter portion.

According to the third aspect, it is possible to prevent the intrusion of water from the gap in the mounting hole into an interior of the base body.

A fourth aspect of the invention provides, based on the above-described configuration, the brake system input apparatus, wherein the master cylinder has a cylinder extending portion that extends from the base body, and wherein the stroke sensor unit includes a base portion in which the detection element is provided, a cylindrical portion that is provided on the base portion and that is fitted on the cylinder extending portion, and the connection terminal portion that extends from the base portion.

According to the fourth aspect, the mounting and fixing of the stroke sensor unit can be facilitated.

A fifth aspect of the invention provides, based on the above-described configuration, the brake system input apparatus, further including: a pushrod that connects the brake operator with the piston; and a covering member that covers the connecting portion between the piston and the pushrod, wherein the covering member is attached to the cylindrical portion.

According to the fifth aspect, the attachment of the covering member becomes simple by adopting the configuration described above.

A sixth aspect of the invention provides, based on the above-described configuration, the brake system input apparatus, wherein a housing is attached to the base body, and the stroke sensor unit is accommodated to and fixed within the housing.

According to the sixth aspect, the stroke sensor unit can be sealed up integrally by a seal member of the housing.

A seventh aspect of the invention provides, based on the above-described configuration, the brake system input apparatus, wherein a mounting hole that extends in a radial direction of the master cylinder is formed in the base body, and the stroke sensor unit is fixed in the mounting hole.

According to the seventh aspect, the assemblage of the sensor unit is facilitated, and the intrusion of water from a gap in the mounting hole into an interior of the base body can be prevented by a seal member of the housing.

An eighth aspect of the invention provides a vehicle brake system including: the above-described brake system input apparatus, and a motor cylinder that generates a brake hydraulic pressure by driving a motor based on an electric signal detected by the stroke sensor unit.

According to the eighth aspect, since the space for installing the brake system input apparatus in the vehicle can be ensured easily, the vehicle brake system can be obtained which can enhance the degree of freedom in laying it out in the vehicle.

According to the invention, it is possible to obtain the brake system input apparatus that can easily ensure the space for installing it in the vehicle and that can reduce the number of assembling man-hours in installing it in the vehicle and the vehicle brake system that utilizes the brake system input apparatus.

DETAILED DESCRIPTION

Embodiments will be described in detail by reference to the drawings as required.

A brake system input apparatus (hereinafter, referred to as an "input apparatus") according to the embodiment will be described as being applied to a vehicle brake system A shown in FIG. 1.
(First Embodiment)

Figure 1:
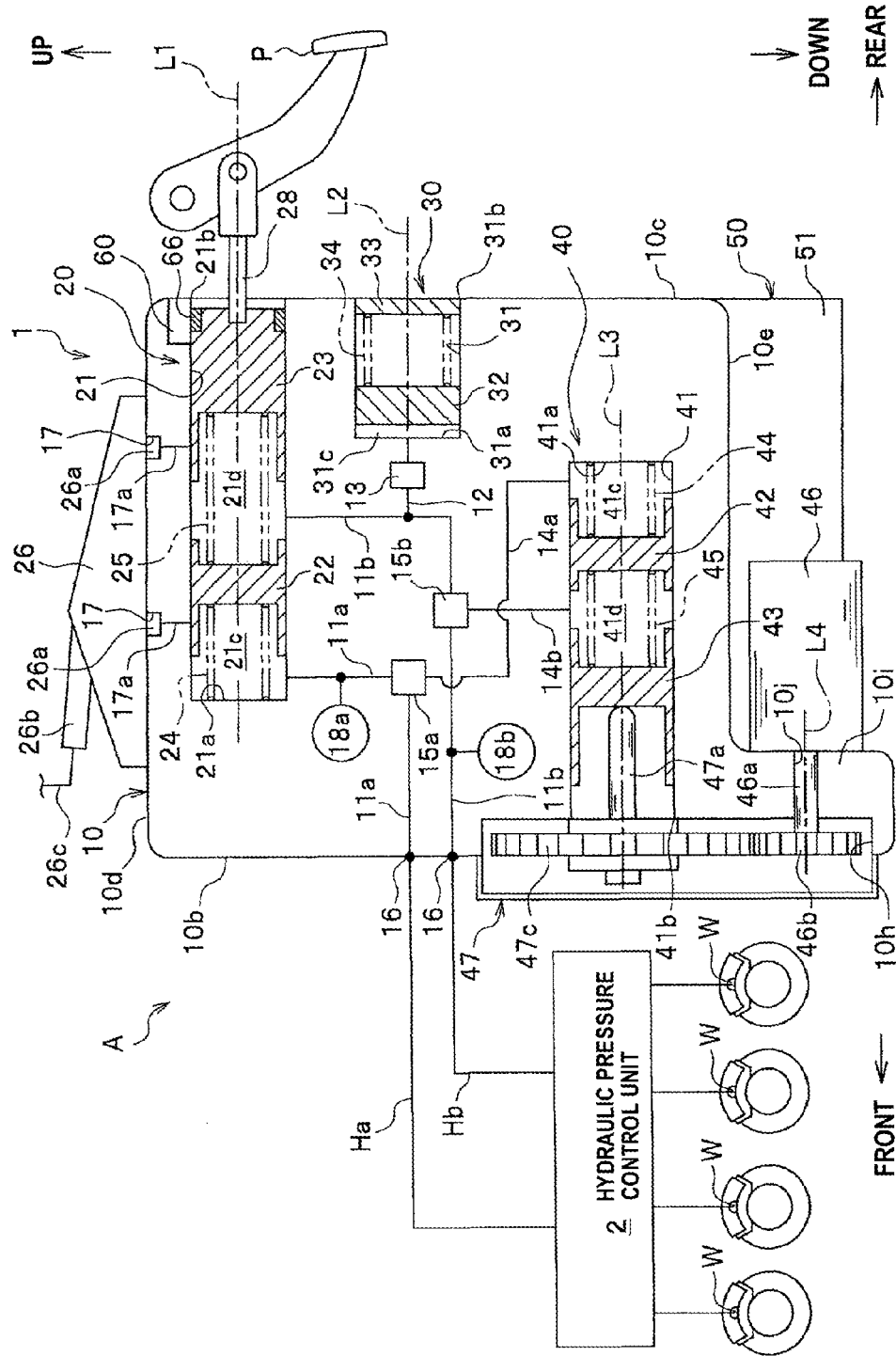
FIG. 1 is an overall block diagram showing a vehicle brake system that utilizes a brake system input apparatus according to a first embodiment.

As shown, in FIG. 1, the vehicle brake system A includes both a brake-by-wire type brake system that operates when a prime motor (an engine, an electric motor or the like) is activated and a hydraulic brake system that operates when the prime motor is stopped.

The vehicle brake system A includes an input apparatus 1 that generates a brake hydraulic pressure according to an operation amount of a brake pedal (a "brake operator") P and a hydraulic pressure control unit 2 that supports the stabilization of vehicle behaviors.

The vehicle brake system A can be installed not only in a motor vehicle that uses an engine (an internal combustion engine) as a power source but also in a hybrid vehicle that uses a motor in parallel with an engine or an electric vehicle and a fuel cell vehicle in which only a motor is used as a drive source.

The input apparatus 1 includes a base body 10, a master cylinder 20 that generates a brake hydraulic pressure by the pedal effort applied to the brake pedal P, a stroke simulator 30 that imparts a pseudo operating reaction force to the brake pedal P, a motor cylinder 40 that generates a brake hydraulic pressure by using a motor 46 as a drive source, and electronic control unit 50.

When referred to in the following description, directions are set for the purpose of describing the input apparatus 1, and in this embodiment, the directions generally coincide with directions resulting when the input apparatus 1 is installed in the vehicle.

Figure 2:
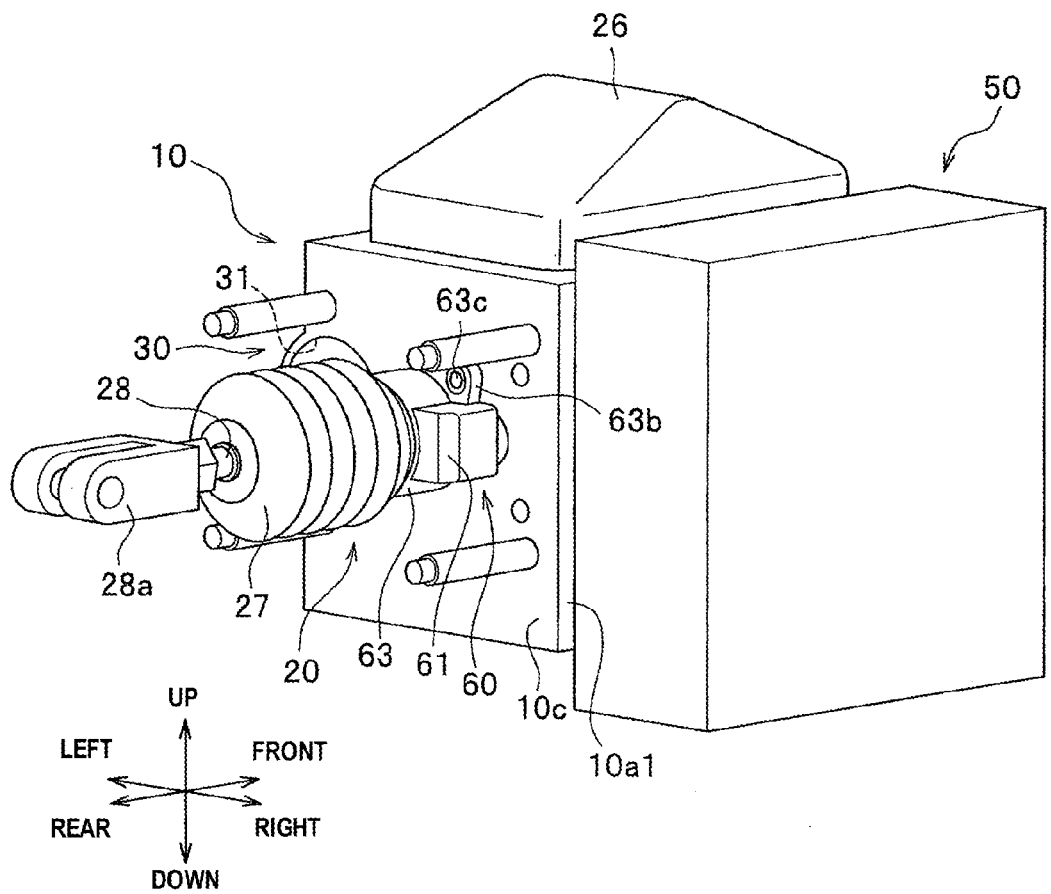
FIG. 2 is an external perspective view of the brake system input apparatus of the first embodiment.

The base body 10 is a metallic part (a non-magnetic metallic part made of, for example, an aluminum alloy) that is installed in the vehicle and exhibits substantially a rectangular parallelepiped shape (refer to FIG. 2). Three cylinder bores 21, 31, 41 and plural hydraulic pressure lines 11a, 11b, 12, 14a, 14b are formed in an interior of the base body 10. Parts such as a reservoir 26, the motor 46 and the like and the electronic control unit 50 are mounted in the base body 10.

An accommodation groove 10h is formed on a front surface 10b of the base body 10. A drive gear 46b and a driven gear 47c are accommodated in this accommodation groove 10h. A motor mounting portion 10i projecting downwards is provided at a front portion of a lower surface 10e of the base body 10. An insertion hole 10j penetrates the motor mounting portion 10i in a front-to-rear direction from a bottom surface of the accommodation groove 10h to a rear surface of the motor mounting portion 10i.

The first cylinder bore 21 is a bottomed circular cylindrical hole and is opened to an end face of a cylinder extending portion 10g (refer to FIGS. 3A and 3B) that is formed on a rear surface 10c of the-base body 10. An axis L1 of the first cylinder bore 21 extends in the front-to-rear direction.

The second cylinder bore 31 is a bottomed circular cylindrical hole that is disposed to a left side of the first cylinder bore 21 (refer to FIGS. 2, 3A and 3B) and is opened to the rear surface 10c of the base body 10. An axis 12 of the second cylinder bore 31 is parallel to the axis L1 of the first cylinder bore 21.

The third cylinder bore 41 is a bottomed circular cylindrical hole that is disposed below the first cylinder bore 21 and is opened to a bottom surface of the accommodation groove 10h. An axis L3 of the third cylinder bore 41 is parallel to the axis L1 of the first cylinder bore 21.

The master cylinder 20 includes two primary pistons 22, 23 that are inserted in the first cylinder bore 21 and two elastic members 24, 25 that are accommodated within the first cylinder bore 21. The reservoir 26 is connected to the master cylinder 20.

A first pressure chamber 21c is formed between a bottom surface 21a of the first cylinder bore 21 and the primary piston 22 that lies to face the bottom surface 21a. A first elastic member 24 that is a coil spring is provided in the first pressure chamber 21c so as to be interposed between the bottom surface 21a and the primary piston 22.

A second pressure chamber 21d is formed between the primary piston 22 that lies to face the bottom surface 21a and the primary piston 23 that lies to face an opening portion 21b. A second elastic member 25 that is a coil spring is provided in the second pressure chamber 21d so as to be interposed between the primary pistons 22, 23.

A rear portion of the primary piston 23 that lies to face the opening portion 21b is connected to the brake pedal P via a pushrod 28. Both the primary pistons 22, 23 receive depression effort applied to the brake pedal P and slide inside the first cylinder bore 21 to thereby pressurize brake fluid in both the pressure chambers 21c, 21d.

A stroke sensor unit 60 is disposed on a side of the master cylinder 20 configured in the way described above. Although the stroke sensor unit 60 will be described in detail later, the stroke sensor unit 60 has a detection element 62 (refer to FIGS. 3A and 3B) that detects a sliding stroke of the primary piston 23.

The reservoir 26 is a container that stores the brake fluid and is attached to an upper surface 10d of the base body 10. Two fluid supply portions 26a that are provided on a lower surface of the reservoir 26 so as to project therefrom are inserted individually in two reservoir union ports 17 that are formed on the upper surface 10d of the base body 10.

Communication holes 17a communicating with an inner circumferential surface of the first cylinder bore 21 are opened to bottom surfaces of the reservoir union ports 17.

A hose 26c (refer to FIG. 1) that extends from a main reservoir (not shown) is connected to a fluid supply tube 26b of the reservoir 26.

Figures 3A, 3B:
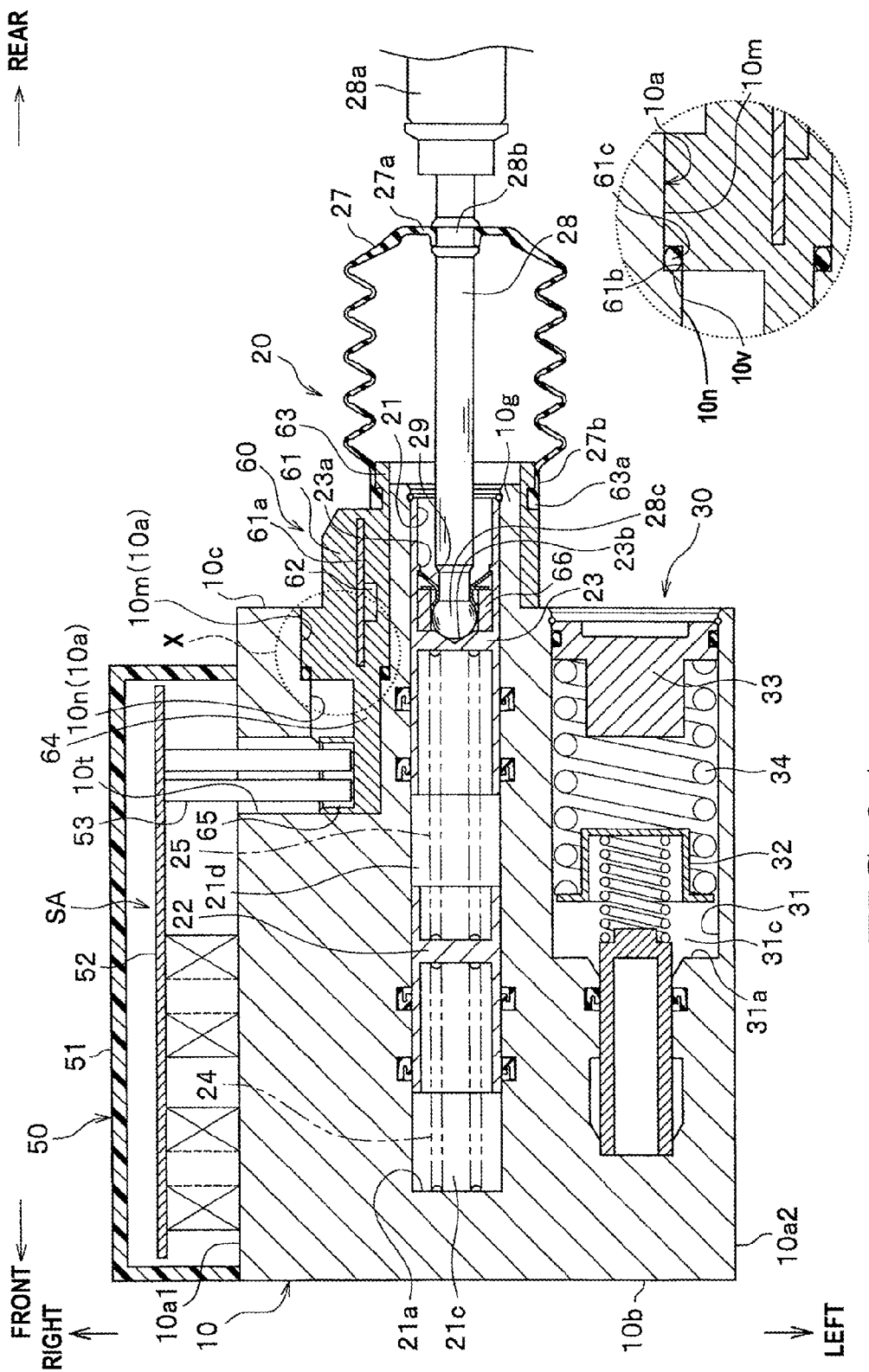
FIG. 3A is a longitudinal horizontal sectional view of the brake system input apparatus of the first embodiment.
FIG. 3B is an enlarged sectional view of a portion denoted by reference character X in FIG. 3A.

As shown in FIGS. 1, 3A and 3B, the stroke simulator 30 Includes a secondary piston 32 that is inserted in the second cylinder bore 31, a lid member 33 that closes an opening portion 31b of the second cylinder bore 31, and an elastic member 34 that is a coil spring that is interposed between the secondary piston 32 and the lid member 33.

A pressure chamber 31c is formed between a bottom surface 31a of the second cylinder bore 31 and the secondary piston 32. The pressure chamber 31c in the second cylinder bore 31 communicates with the second pressure chamber 21d in the first cylinder bore 21 via a branch hydraulic pressure line 12, which will be described later, and a second main hydraulic pressure line 11b. Consequently, the secondary piston 32 of the stroke simulator 30 is caused to move against a biasing force of the elastic member 34 by a brake hydraulic pressure generated in the second pressure chamber 21d of the master cylinder 20, and a pseudo operating reaction force is imparted to the brake pedal P by the secondary piston 32 so biased.

As shown in FIG. 1, the motor cylinder 40 includes two tertiary pistons 42, 43 that are inserted in the third cylinder bore 41 and two elastic members 44, 45 that are accommodated within the third cylinder bore 41. The motor 46 is connected to the motor cylinder 40 via a drive transmitting portion 47.

A first pressure chamber 41c is formed between a bottom surface 41a of the third cylinder bore 41 and the tertiary piston 42 that lies to face the bottom surface 41a. The first elastic member 44 that is a coil spring is provided in the first pressure chamber 41c so as to be interposed between the bottom surface 41a and the tertiary piston 42 that lies to face the bottom surface 41a.

The first pressure chamber 41c of the motor cylinder 40 communicates with a first main hydraulic pressure line 11a through a first communication hydraulic pressure line 14a, which will be described later.

A second pressure chamber 41d is formed between the tertiary piston 42 that lies to face the bottom side 41a and the tertiary piston 43 that lies to face an opening portion 41b. The second elastic member 45 is provided in the second pressure chamber 41d so as to be interposed between the tertiary pistons 42, 43.

The second pressure chamber 41d of the motor cylinder 40 communicates with a second main hydraulic pressure line 11b through a second communication hydraulic pressure line 14b, which will be described later.

The motor 46 is an electric servo motor that is controlled to be driven by the electronic control unit 50. An output shaft 46a projects towards the front from a central portion on a front end face of the motor 46.

The front end face of the motor 46 is attached to the rear surface of the motor mounting portion 10i of the base body 10. The output shaft 46a is inserted through the insertion hole 10j to project into the accommodation groove 10h. The drive gear 46b that is a spur gear is attached to a front end portion of the output shaft 46a.

The motor 46 is disposed directly below the lower surface 10e of the base body 10 and is mounted at a lowermost portion (the motor mounting portion 10i) of the base body 10. An axis L4 of the output shaft 46a is parallel to the axis L3.

The drive transmitting portion 47 converts a rotational driving force of the output shaft 46a of the motor 46 into a straight-line axial force.

The drive transmitting portion 47 includes a rod 47a that is in abutment with the tertiary piston 43 that lies to face the opening portion 41b and the driven gear 47c that is a spur gear that is disposed so as to surround the rod 47a.

The rod 47a is inserted into the third cylinder bore 41 from the opening portion 41b, and a rear end portion of the rod 47a is in abutment with the piston 43 that lies to face the opening portion 41b. A front portion of the rod 47a projects to the front from the bottom surface of the accommodation groove 10h. The driven gear 47c is accommodated within the accommodation groove 10h.

The rod 47a and the driven gear 47c are connected to each other via a ball screw mechanism, not shown. The driven gear 47c is in mesh engagement with the drive gear 46b of the output shaft 46a.

Consequently, when the output shaft 46a rotates, its rotational driving force is inputted into the drive gear 46b and the driven gear 47c. Then, a straight-line axial force is imparted to the rod 47a via the ball screw mechanism, whereby the rod 47a reciprocates in the front-to-rear direction.

When the rod 47a moves to the rear, both the tertiary pistons 42, 43 receive an input from the rod 47a and slide within the third cylinder bore 41 to thereby pressurize the brake fluid in both the pressure chambers 41c, 41d.

As shown in FIGS. 3A and 3B, the electronic control unit 50 has a housing 51 as a resin box that is attached to. a right side surface 10a1 of the base body 10, and a control circuit board 52 is accommodated within the housing 51. The control circuit board 52 is disposed so as to face a connection terminal portion 65 of the stroke sensor unit 60 and is connected to the connection terminal portion 65 through a bus bar 53 that is a connection terminal.

As shown in FIG. 1, the electronic control unit 50 controls the operation of the motor 46, the opening and closing of a normally closed solenoid valve 13 and the switching of flow paths by both selector valves 15a, 15b based on information obtained from various sensors such as both pressure sensors 18a, 18b, the stroke sensor unit 60 and the like and programs or the like that are stored therein in advance.

As shown in FIG. 1, the hydraulic pressure control unit 2 includes a configuration that can execute various hydraulic pressure controls such as anti-lock braking control, a vehicle behavior stabilization control and the like by controlling as required brake hydraulic pressures imparted to respective wheel cylinders W of wheel brakes. The hydraulic pressure control unit 2 is connected to the wheel cylinders W through piping.

Although not shown, the hydraulic pressure control unit 2 includes a hydraulic pressure unit in which solenoid valves, a pump and the like are provide, a motor that drives the pump, and an electronic control unit that controls the solenoid valves, the motor and the like.

Next, a configuration around the pushrod 28 and a configuration around the stroke sensor unit 60 will be described by reference to FIGS. 3A and 3B.

The pushrod 28 includes a connecting portion 28*a*, a collar portion 28*b*, and a spherical distal end portion 28*c*. The brake pedal P is connected to the connecting portion 28*a* (refer to FIG. 1). The collar portion 28*b* is a portion with which a rear end portion 27*a* of a boot 27 that functions as a covering member is brought into engagement. The spherical distal end portion 28*c* is a portion that is connected to an inner side of a rear portion of the primary piston 23. The spherical distal end portion 28*c* is brought into abutment with a recess portion 23*b* formed in an inner portion of the primary piston 23 and is held to the primary piston 23 so as not to be dislocated therefrom with a snap ring 29. The snap ring 29 has a characteristic of spring. A rear end portion of the snap ring 29 is locked on a projecting portion 23*a* that is formed on an inner surface of a rear portion of the primary piston 23, whereby the snap ring 29 functions to bias the spherical distal end portion 28*c* towards the recess portion 23*b*. A magnet 66 that functions as a detected member is disposed around the circumference of the spherical distal end portion 28*c*.

The magnet 66 exhibits a circular cylindrical shape and is held within a space defined by being surrounded by a rear surface of the primary piston 23, the spherical distal end portion 28*c* and the snap ring 29. This causes the magnet 66 to move back and forth along the axis L1 of the first cylinder bore 21 together with the primary piston 23 when it slides.

Part of the stroke sensor unit 60 is inserted in a mounting hole 10*a* formed in the base body 10. The mounting hole 10*a* is formed to a side of the cylinder extending portion 10*g* and is opened to the rear surface 10*c*. The mounting hole 10*a* is formed so as to extend along the axial direction of the master cylinder 20 (parallel to the axis L1) from the rear surface 10*c* to the front surface 10*b* of the base body 10. The mounting hole 10*a* includes a large-diameter portion 10*m* that is opened to the rear surface 10*c* and a small-diameter portion 10*n* that is smaller in diameter than the large-diameter portion 10*m*. A seal member 61*c* is disposed on a bottom surface 10*v* of the large-diameter portion 10*m* that is a boundary portion between the large-diameter portion and the small-diameter portion.

A front end portion of the small-diameter portion 10*n* communicates with a bus bar insertion hole 10*t*. The bus bar insertion hole 10*t* is a horizontal lateral hole that is formed so as to extend from the right side surface 10*a*1 of the base body 10 that constitutes an attaching surface for the electronic control unit 50 to a left side surface 10*a*2 that lies opposite to the right side surface 10*a*1. This bus bar insertion hole is opened not only to the right side surface 10*a*1 but also to the small-diameter portion 10*n* of the mounting hole 10*a*. The bus bar insertion hole 10*t* is opened to a sealed area SA within the housing 51 that is sealed by a seal member, not shown in the right side surface 10*a*1.

The stroke sensor unit 60 includes a base portion 61, a cylindrical portion 63, and a front extending portion 64. A sensor circuit board 61*a* is disposed in an interior of the base portion 61, and a detection element 62 is mounted on the sensor circuit board 61*a*. The detection element 62 is disposed so as to face the magnet 66 on the primary piston 23 and detects a sliding stroke of the primary piston 23 by detecting a movement of the magnet 66 in the front-to-rear direction.

A front portion of the base portion 61 is fitted in the large-diameter portion 10*m* of the mounting hole 10*a*. A circumferential groove 61*b* is formed on a front end portion of the base portion 61 so as to face the bottom surface 10*v* of the large-diameter portion 10*m* of the mounting hole 10*a*. The seal member 61*c* is disposed in an annular space ensured by the bottom surface 10*v* and the circumferential groove 61*b*. This enables the seal member 61*c* to be closely attached to both the bottom surface 10*v* and the circumferential groove 61*b* when the stroke sensor unit 60 is mounted in the base body 10 (the mounting hole 10*a*), whereby a gap between the stroke sensor unit 60 and the base body 10 (the mounting hole 10*a*) is sealed up via the seal member 61*c*.

The cylindrical portion 63 is provided integrally on a rear portion of the base portion 61 and can fit on the cylinder extending portion 10*g*. An axial length of the cylindrical portion 63 is made longer than an axial length of the cylinder extending portion 10*g*. By adopting this configuration, when the cylindrical portion 63 is fitted on the cylinder extending portion 10*g*, a rear end portion of the cylindrical portion 63 projects further rearwards than a rear end portion of the cylinder extending portion 10*g*. A circumferential groove 63*a* is formed on an outer circumferential surface of the rear end portion that so projects. A front end portion 27*b* of the boot 27 is installed in this circumferential groove 63*a*.

A fixing piece 63*b* is formed on the cylindrical portion 63 so as to extend along the rear surface 10*c* of the base body 10, as shown in FIG. 2. An insertion hole, not shown, is formed in the fixing piece 63*b*. A fixing screw 63*c* is inserted through this insertion hole to be screwed in a threaded hole, not shown, that is formed in the rear surface 10*c* of the base body 10, whereby the cylindrical portion 63 (the stroke sensor unit 60) is fixed to the base body 10.

The front extending portion 64 extends from the front portion of the base portion 61 to the front (towards the bottom surface of the mounting hole 10*a*). The connection terminal portion 65 is provided on a right side surface of a front end of the front extending portion 64, and this connection terminal portion 65 functions not only as a power supply port to the sensor circuit board 63*a* but also as an output port of an electric signal. The connection terminal portion 65 is situated at a bottom portion of the bus bar insertion hole 10*t* to face the control circuit board 52 that is disposed within the electronic control unit 50 in such a state that the stroke sensor unit 60 is inserted into the mounting hole 10*a*. The bus bar 53 extending front the control circuit board 52 is connected to the connection terminal portion 65 through the bus bar insertion hole 10*t*. When viewed from the top, the bus bar insertion hole 10*t* is formed so as to be at right angles to the axis L1 (refer to FIG. 1) of the first cylinder bore 21. Consequently, compared with a case where the bus bar insertion hole 10*t* is formed at a certain angle relative to the axis L1, the bus bar 53 extends a shortest length possible.

Next the hydraulic pressure lines that are formed in the base body 10 will be described.

As shown in FIG. 1, the two main hydraulic pressure lines 11*a*, 11*b* are hydraulic pressure lines that extend from the first cylinder bore 21 of the master cylinder 20 as their originating point.

The first main hydraulic pressure line 11*a* communicates with the first pressure chamber 21*c* of the master cylinder 21. The second main hydraulic pressure line 11b communicates with the second pressure chamber 21d of the master cylinder 20. Pipings Ha, Hb that reach the hydraulic pressure control unit 2 are connected individually to two output ports 16 that are terminating points of both the main hydraulic pressure lines 11a, 11b.

The branch hydraulic pressure line 12 is a hydraulic pressure line that originates from the pressure chamber 31c of the stroke simulator 30 to reach the second main hydraulic pressure line 11b. The normally closed solenoid valve 13 is provided along the branch hydraulic pressure line 12. The normally closed solenoid valve 13 opens and closes the branch hydraulic pressure line 12.

The two communication hydraulic pressure lines 14a, 14b are hydraulic pressure lines that originate from the third cylinder bore 41 of the motor cylinder 40. The first communication hydraulic pressure line 14a originates from the first pressure chamber 41c to communicate with the first main hydraulic pressure line 11a. The second communication hydraulic pressure line 14b originates from the second pressure chamber 41d to communicate with the second main hydraulic pressure line 11b.

The first selector valve 15a is provided at a communicating portion between the first main hydraulic pressure line 11a and the first communication hydraulic pressure line 14a.

The first selector valve 15a is a three-way solenoid valve that allows a downstream side (a side reaching the output port 16) of the first main hydraulic pressure line 11a to communicates with an upstream side (a side reaching the master cylinder 20) of the first main hydraulic pressure line 11a or the first communication hydraulic pressure line 14a. The communicating states of this first selector valve 15a are switched over by the electronic control unit 50, which will be described later.

The second selector valve 15b is provided at a communicating portion between the second main hydraulic pressure line 11b and the second communication hydraulic pressure line 14b.

The second selector valve 15b is a three-way solenoid valve similar to the first selector valve 15a and allows a downstream side of the second main hydraulic pressure line 11b to communicate with an upstream side of the second main hydraulic pressure line 11b or the second communication hydraulic pressure line 14b.

The two pressure sensors 18a, 18b detect the magnitude of a brake hydraulic pressure and are installed individually in sensor installation holes (not shown) that communicate individually with the main hydraulic pressure lines 11a, 11b. Information obtained at both the pressure sensors 18a, 18b is outputted to the electronic control unit 50.

The first pressure sensor 18a is disposed upstream of the first selector valve 15a and detects a brake hydraulic pressure that is generated in the master cylinder 20 when the downstream side and the upstream side of the first main hydraulic pressure line 11a are allowed to communicate with each other by the first selector valve 15a.

The second pressure sensor 18b is disposed downstream of the second selector valve 15b and detects a brake hydraulic pressure that is generated in the motor cylinder 40 when the downstream side of the second main hydraulic pressure line 11b is allowed to communicate with the second communication hydraulic pressure line 14b by the second selector valve 15b.

Next, the operation of the vehicle brake system A will be described briefly.

In the vehicle brake system A, when an ignition switch of the vehicle is turned on or the detection element 62 of the stroke sensor unit 60 detects that the brake pedal P is slightly depressed, as shown in FIG. 1, the communication between the upstream side and the downstream side of the first main hydraulic pressure line 11a is cut off and a communication between the downstream side of the first main hydraulic pressure line 11a and the first communication hydraulic pressure line 14a is established by the first selector valve 15a. The communication between the upstream side and the downstream side of the second main hydraulic pressure line 11b is cut off and a communication between the downstream side of the second main hydraulic pressure line 11b and the second communication hydraulic pressure line 14b is established by the second selector valve 15b. The normally closed solenoid valve 13 is opened.

In this state, the brake hydraulic pressure generated in the master cylinder 20 by the depression of the brake pedal P is not transmitted to the wheel cylinders W but is transmitted to the stroke simulator 30. Then, the brake hydraulic pressure in the pressure chamber 31c becomes large, and the secondary piston 32 moves towards the lid member 33 against the biasing force of the elastic member 34, whereby the stroke of the brake pedal P is permitted. As this occurs, a pseudo operating reaction force is imparted to the brake pedal P by the secondary piston 32 that is biased by the elastic member 34.

When the depression of the brake pedal P is detected by the detection element 62 of the stroke sensor unit 60, the motor 46 of the motor cylinder 40 is driven, and both the tertiary pistons 43, 44 move towards the bottom surface 41a, whereby the brake fluid in both the pressure chambers 41c, 41d is pressurized.

The electronic control unit 50 compares the brake hydraulic pressure that is outputted from the motor cylinder 40 (the brake hydraulic pressure that is detected by the second pressure sensor 18b) with the brake hydraulic pressure that is outputted from the master cylinder 20 (the brake hydraulic pressure that is defected by the first pressure sensor 18a) and controls the rotating speed, of the motor 46 or the like based on the results of the comparison. Thus, in the input apparatus 1, the brake hydraulic pressure is generated according to the depression amount of the brake pedal P.

The brake hydraulic pressure generated in the input apparatus 1 is transmitted to the wheel cylinders W via the hydraulic pressure control unit 2 to activate the wheel cylinders W to operate, whereby braking forces are imparted to the wheels.

In such a state that the motor cylinder 40 is inoperable (for example, due to the unavailability of electric power), the communication between the downstream side of the first main hydraulic pressure line 11a and the first communication hydraulic pressure line 14a is cut off and a communication between the upstream side and the downstream side of the first main hydraulic pressure line 11a is established by the first selector valve 15a. The communication between the downstream side of the second main hydraulic pressure line 11b and the second communication hydraulic pressure line 14b is cut off and a communication between the downstream side and the upstream side of the second main hydraulic pressure line 11b is established by the second selector valve 15b. The normally closed solenoid valve 13 is closed. In this state, the brake hydraulic pressure generated in the master cylinder 20 is transmitted to the wheel cylinders W.

In the above-described input apparatus 1, the input based on the brake operation by the operating person can be detected by the stroke sensor unit 60 that is disposed to the side of the master cylinder 20.

The detection signal signaling the depression amount of the brake pedal P that is detected by the stroke sensor unit 60 is outputted from the connection terminal portion 65 to the control circuit board 52 through the bus bar 53. Thus, in this embodiment, the stroke sensor unit 60 can electrically be connected to the control circuit board 52 while being formed integrally on the base body 10. Therefore, the input apparatus 1 can be made small in size while the sensor stroke unit 60 is formed integrally on the base body 10, whereby an advantage can be obtained that the space of installing the input apparatus 1 in the vehicle can easily be ensured.

Due to the input apparatus 1 including the stroke sensor unit 60, compared with a case where the stroke sensor unit 60 is configured as a separate unit from the base body 10, the placement of the stroke sensor unit 60 and the laying out of signal wires become unnecessary, and this can reduce not only the number of assembling man-hours in installing the input apparatus 1 in the vehicle but also the number of parts involved, thereby making it possible to realize a reduction in production costs.

The mounting hole 10a where the stroke sensor unit 60 is mounted is opened to the rear surface 10c of the base body 10. This allows the stroke sensor unit 60 to be installed in the mounting hole 10a from an external portion of the base body 10, facilitating the assemblage of the stroke sensor unit 60 to the base body 10.

The mounting hole 10a is formed to extend along the axial direction of the master cylinder 20, and therefore, the relative positional relationship between the magnet 66 provided in the master cylinder 20 and the stroke sensor unit 60 (the detection element 62) can easily be adjusted by moving the stroke sensor unit 60 along the axial direction of the master cylinder 20. This contributes to improving the detection accuracy.

The seal member 61c is disposed on the bottom surface 10v of the large-diameter portion 10m of the mounting bole 10a, and the gap between, the stroke sensor unit 60 and the base body 10 is sealed up by the seal member 61c so disposed. Therefore, it is possible to prevent the intrusion of water into the interior of the base body 10 from the gap in the mounting hole 10a.

The stroke sensor unit 60 can be mounted in the base body 10 by installing the cylindrical portion 63 on the cylinder extending portion 10g. Therefore, the stroke sensor unit 60 can easily be mounted and fixed.

The boot 27 can be mounted by making use of the cylindrical portion 63, and therefore, the boot 27 can be mounted easily and simply.

The input apparatus 1 is configured so as to easily ensure the space for installing it in the vehicle, and therefore, the vehicle brake system can be obtained which can enhance the degree of freedom in laying it in the vehicle.

(Second Embodiment)

Figure 4:
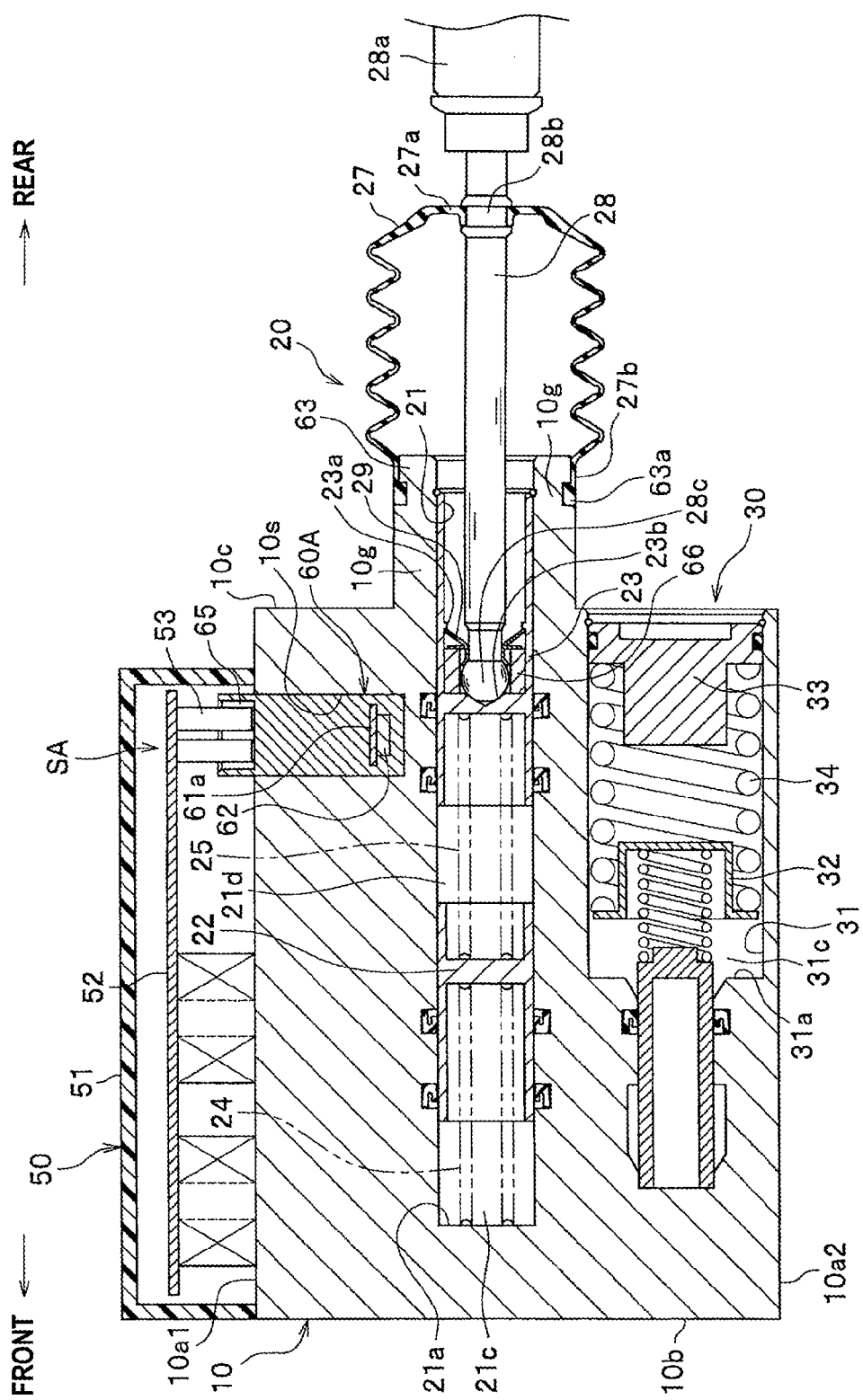
FIG. 4 is a longitudinal horizontal sectional view of a brake system input apparatus according to a second embodiment.

An input apparatus of a second embodiment will be described by reference to FIG. 4. The second embodiment differs from the first embodiment in that a mounting hole 10s is formed in a base body 10 in a sealed area SA that is surrounded by a seal member, not shown, that is provided in a housing 51 for a stroke sensor unit 60A to be mounted in the mounting hole 10s.

The mounting hole 10s is a bottomed circular cylindrical horizontal lateral hole that is formed to extend from a right side surface 10a1 towards a left side surface 10a2 and is opened to the right side surface 10a1 of the base body 10 that is situated within the housing 51 (within the sealed area SA). A bottom portion of the mounting hole 10s reaches a position near a primary piston 23 of a master cylinder 20.

The stroke sensor unit 60A exhibits a shape (a circular cylindrical shape in this embodiment) that enables the stroke sensor unit 60A to be inserted into the mounting hole 10s. A sensor circuit board 61a is disposed in an interior of a distal end portion of the stroke sensor unit 60A, and a detection element 62 is mounted on the sensor circuit board 61a. The detection element 62 is disposed so as to face a magnet 66 on the primary piston 23, and a sliding stroke of the primary piston 23 is detected by detecting a movement of the magnet 66 in a front-to-rear direction.

The shape of the stroke sensor unit 60A is not limited to the circular cylindrical shape, and hence, various shapes including a prism-like shape or the like can be adopted.

A connection terminal portion 65 of the stroke sensor unit 60A projects from the right side surface 10a1 of the base body 10 into the housing 51 and is disposed to face a control circuit hoard 52 in such a state that the stroke sensor unit 60A is mounted in the mounting hole 10s. The connection terminal portion 65 and the control circuit hoard 52 are connected to each other by a bus bar 53 that is a connection terminal.

As with the magnet of the first embodiment 1, the magnet 66 is disposed on the circumference of a spherical distal end portion 28c inside the primary piston 23.

According to the input apparatus 1 of this embodiment, the stroke sensor unit 60A can be mounted in the base body 10 without any seal. Consequently, not only can the number of assembling man-hours in installing the stroke sensor unit 60A in the base body 10 be reduced, but also the number of parts involved can be reduced, thereby making it possible to realize a reduction in production costs.

Thus, while the embodiments have been described heretofore, the invention is not limited to the embodiments but can be altered or modified as required without departing from the spirit and scope thereof.

In the first embodiment, while the stroke sensor unit 60 is described as having the cylindrical portion 63, the cylindrical portion 63 does not necessarily have to be provided. While the magnet 66 is described as being provided on the atmosphere side of the primary piston 23, the invention is not limited thereto, provided that the magnet is held integrally to the primary piston 23. For example, a circumferential groove is provided on an outer circumferential surface of the primary piston 23 for the magnet to be disposed therein.

While the seal member 61c is described as being disposed in the circumferential groove 61b that faces the bottom surface 10v of the mounting hole 10a (refer to FIG. 3B), the invention is not limited thereto. A seal groove is formed on the outer circumferential surface of the base portion 61 for the seal member 61c to be disposed in the seal groove so formed.

In the second embodiment, while the mounting hole 10s is described as being at right angles to the axis L1 of the first cylinder bore 21, the mounting hole 10s may be inclined relative to the axis L1, provided that the connection terminal portion 65 is disposed to face the control circuit board 52.

In the first and second embodiments, while the master cylinder 20 and the motor cylinder 40 are described as being made up of the tandem-type cylinder that has the two pistons, the master cylinder and the motor cylinder may be made up of a cylinder having one piston.

The connection terminal is not limited to the bus bar 53. Thus, press fitting, wire bonding, spring contact and the like can be adopted as a connection terminal.

The invention claimed is:

1. A brake system input apparatus into which a brake operation performed by an operating person is inputted, comprising:
   a base body;
   a master cylinder that is provided in the base body and that generates a brake hydraulic pressure by a piston, the piston being connected to a brake operator;
   a stroke sensor unit that is attached to the base body on a side of the master cylinder and that has a detection element, the detection element being configured to detect a sliding stroke of the piston; and
   a control circuit board that is provided on a side of the base body and remote from the stroke sensor unit,
   wherein the stroke sensor unit has a connection terminal portion that is connected to a connection terminal of the control circuit board, and
   wherein the connection terminal portion is disposed so as to face the control circuit board.

2. The brake system input apparatus of claim 1, wherein a mounting hole is formed in the base body along an axial direction of the master cylinder, and the stroke sensor unit is mounted in the mounting hole.

3. The brake system input apparatus of claim 2, wherein the mounting hole is a stepped circular cylinder, and a gap between the stroke sensor unit and the base body is sealed up by a seal member that is disposed at a bottom of a large-diameter portion.

4. The brake system input apparatus of claim 1, wherein the master cylinder has a cylinder extending portion that extends from the base body, and wherein the stroke sensor unit includes
   a base portion in which the detection element is provided,
   a cylindrical portion that is provided on the base portion and that is fitted on the cylinder extending portion, and
   the connection terminal portion that extends from the base portion.

5. The brake system input apparatus of claim 4, further comprising:
   a pushrod that connects the brake operator with the piston; and
   a covering member that covers the connecting portion between the piston and the pushrod,
   wherein the covering member is attached to the cylindrical portion.

6. The brake system input apparatus of claim 1, wherein a housing is attached to the base body, and the stroke sensor unit is accommodated to and fixed within the housing.

7. The brake system input apparatus of claim 6, wherein a mounting hole that extends in a radial direction of the master cylinder is formed in the base body, and the stroke sensor unit is fixed in the mounting hole.

8. A vehicle brake system comprising:
   the brake system input apparatus of claim 1, and
   a motor cylinder that generates a brake hydraulic pressure by driving a motor based on an electric signal detected by the stroke sensor unit.

9. The brake system input apparatus of claim 1, further comprising:
   a first cylinder bore which is a bottomed circular cylindrical hole and opened to an end face of a cylinder extending portion that is formed on a rear surface of the base body;
   a second cylinder bore which is a bottomed circular cylindrical hole disposed to a left side of the first cylinder bore and opened to the rear surface of the base body;
   an axis L2 of the second cylinder bore is parallel to an axis L1 of the first cylinder bore;
   a third cylinder bore which is a bottomed circular cylindrical hole disposed below the first cylinder bore and opened to a bottom surface of an accommodation groove formed on a front surface of the base body; and
   an axis L3 of the third cylinder bore is parallel to the axis L1 of the first cylinder bore.

10. The brake system input apparatus of claim 9, wherein the stroke simulator includes a secondary piston that is inserted in the second cylinder bore.

11. The brake system input apparatus of claim 1, wherein an electronic control unit has a housing as a resin box that is attached to the base body,
    the control circuit board is accommodated within the housing, and
    the control circuit board is disposed so as to face the connection terminal portion of the stroke sensor unit and is connected to the connection terminal portion through a bus bar that is the connection terminal.

12. The brake system input apparatus of claim 11, wherein part of the stroke sensor unit is inserted in a mounting hole formed in the base body,
    the mounting hole is formed to a side of a cylinder extending portion and is opened to the rear surface, and
    the mounting hole is formed so as to extend along the axial direction of the master cylinder from the rear surface to the front surface of the base body.

13. The brake system input apparatus of claim 12, wherein the mounting hole includes a large-diameter portion that is opened to the rear surface and a small-diameter portion that is smaller in diameter than the large-diameter portion, and
    a seal member is disposed on a bottom surface of the large-diameter portion that is a boundary portion between the large-diameter portion and the small-diameter portion.

14. The brake system input apparatus of claim 13, wherein a front end portion of the small-diameter portion communicates with a bus bar insertion hole,
    the bus bar insertion hole is a horizontal lateral hole that is formed so as to extend from a right side surface of the base body that constitutes an attaching surface for the electronic control unit to a left side surface that lies opposite to the right side surface,
    the bus bar insertion hole is opened to the right side surface and to the small-diameter portion of the mounting hole, and
    the bus bar insertion hole is opened to a sealed area within the housing.

15. The brake system input apparatus of claim 1, wherein the stroke sensor unit includes a base portion, a cylindrical portion, and a front extending portion,
    a sensor circuit board is disposed in an interior of the base portion,
    the detection element is mounted on the sensor circuit board, and
    the detection element is disposed so as to face a magnet on a primary piston and detect a sliding stroke of the primary piston by detecting a movement of the magnet in the front-to-rear direction.

16. The brake system input apparatus of claim 14, wherein
a front portion of the base portion is fitted in the large-diameter portion of the mounting hole,
a circumferential groove is formed on a front end portion of the base portion so as to face the bottom surface of the large-diameter portion of the mounting hole,
a seal member is disposed in an annular space ensured by the bottom surface and the circumferential groove, and
a gap between the stroke sensor unit and the base body is sealed up via the seal member.

17. The brake system input apparatus of claim 14, wherein
the connection terminal portion is situated at a bottom portion of the bus bar insertion hole to face the control circuit board that is disposed within the electronic control unit in such a state that the stroke sensor unit is inserted into the mounting hole, and
the bus bar extends from the control circuit board to connect to the connection terminal portion through the bus bar insertion hole.

18. The brake system input apparatus of claim 11, wherein
part of the stroke sensor unit is inserted in a mounting hole formed in the base body, and
the mounting hole is a bottomed circular cylindrical horizontal lateral hole that is formed to extend from a right side surface towards a left side surface and is opened to the right side surface of the base body that is situated within the housing.

19. The brake system input apparatus of claim 18, wherein
a bottom portion of the mounting hole reaches a position near a primary piston of a master cylinder.

20. The brake system input apparatus of claim 18, wherein
the connection terminal portion of the stroke sensor unit projects from the right side surface of the base body into a housing and is disposed to face the control circuit board in such a state that the stroke sensor unit is mounted in the mounting hole without any seal.

21. The brake system input apparatus of claim 2,
wherein a connection terminal insertion hole to insert the connection terminal of the control circuit board is formed in the base body to open towards the control circuit board, and
wherein the mounting hole communicates with the connection terminal insertion hole.

\* \* \* \* \*